Jan. 31, 1961   H. R. NILSSON ET AL   2,969,958
ROTARY DEVICES, PARTICULARLY ROTARY HEAT EXCHANGERS
Filed March 14, 1955   3 Sheets-Sheet 2
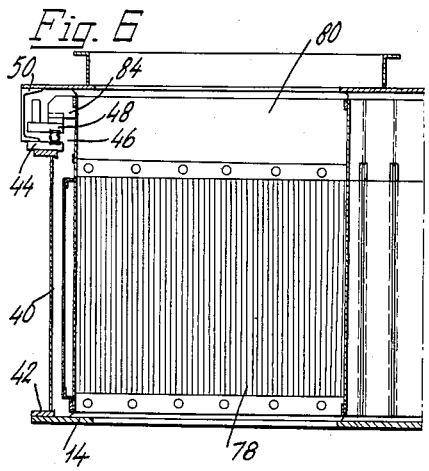
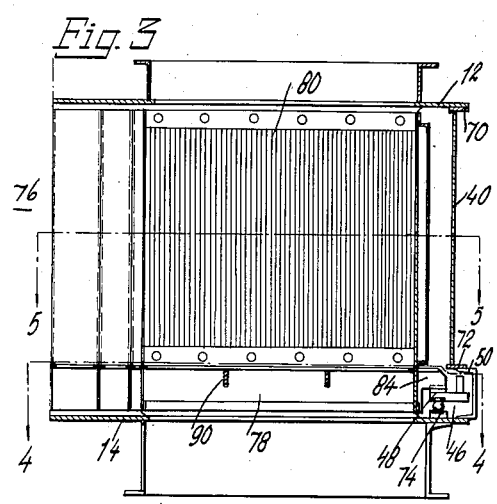
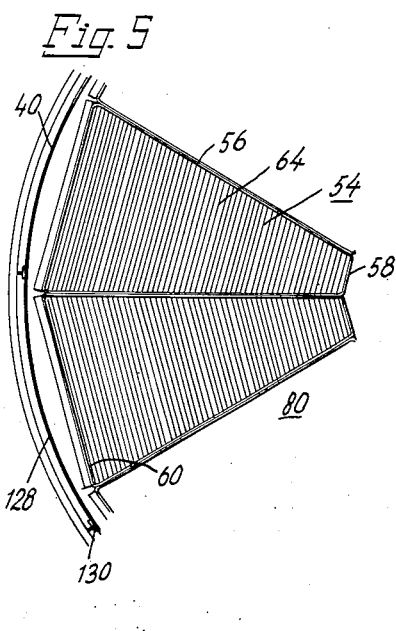
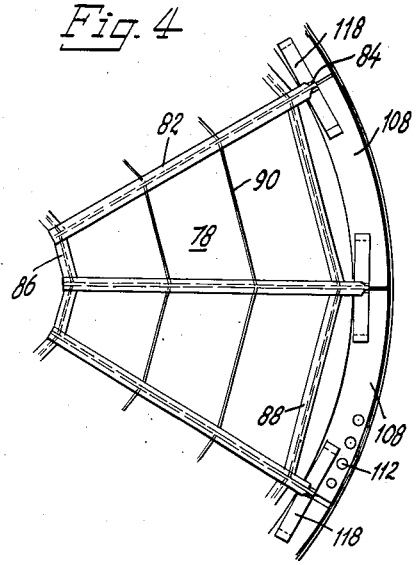
INVENTORS
BY

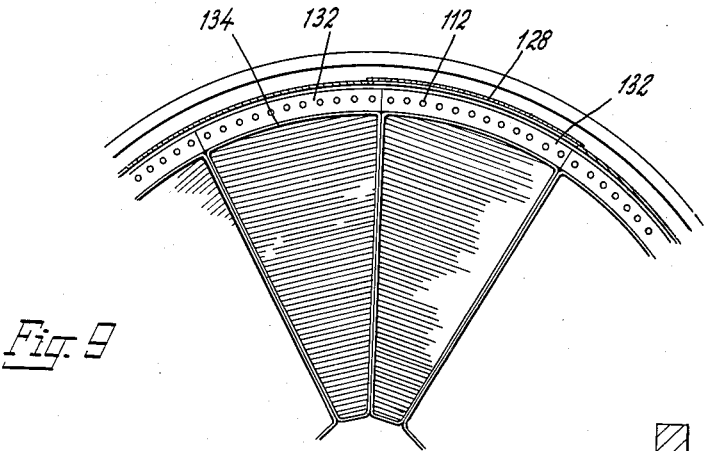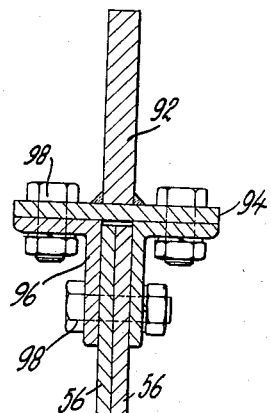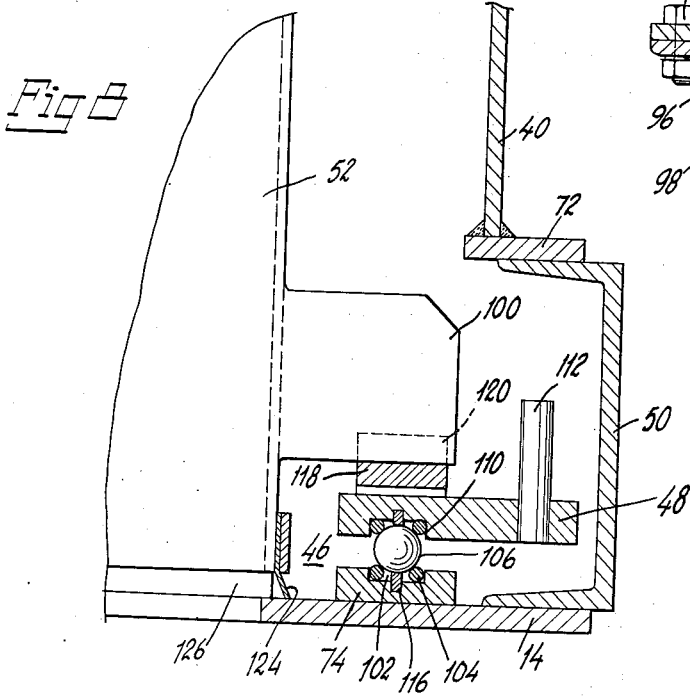

United States Patent Office 2,969,958
Patented Jan. 31, 1961

2,969,958

ROTARY DEVICES, PARTICULARLY ROTARY HEAT EXCHANGERS

Hans Robert Nilsson, Ektorp, and Per Walther Sigvard Persson, Johanneshov, Sweden, assignors to Svenska Rotor Maskiner Aktiebolag, Nacka, Sweden, a corporation of Sweden Filed Mar. 14, 1955, Ser. No. 494,008

27 Claims. (Cl. 257—267)

The present invention relates to rotary devices and more particularly to such a device including a rotary structure adapted for anti-friction mounting at its periphery.

The general object of the invention is to provide a rotary device having a rotor comprising an assembly of a plurality of units, which are easy to transport from the factory to the site of the use of the apparatus, wherein the rotor forms a component and which units are readily secured in the integral rotor in which the units are replaceable with a minimum of inconvenience and labour.

According to the present invention a rotor device comprises a rotor component, a stationary component and bearing means for rotatably supporting the rotor component at the outer periphery thereof with respect to the stationary component, said rotor component comprising a plurality of sector or wedge shape baskets positioned in abutting relationship around the centre of the rotary device so that the radial sides of contiguous baskets define partitions extending radially from the inner to the outer periphery of the rotor component and the inner and the outer walls of the rotor component comprise abutting transverse ends of abutting baskets.

The wedge shaped baskets are fastened together with suitable joining means such as bolts or rivets fastening the baskets together along the marginal portions of the abutting radial side walls of the baskets so that a coherent rotor component thus is formed thereby which may be suspended on or carried by the bearing means provided for rotatably supporting the rotor component at the outer periphery thereof.

In another form, the rotor device according to the invention comprises two superimposed portions, a first portion of which comprises a structural plate framework suspended on or carried by the bearing means and the second portion of which comprises a structure made up of basket units fastened together, said basket structure being suspended from or carried by the structural plate framework.

It is an additional object of the invention to provide an attachment for revolving the rotor equipment which will provide the equipment with a ball bearing assembly on which the rotor is carried by its own weight and on which the same can be operated and wherein one of the races includes a pin rack or similar means while the other race serves as a support for connecting the assembly to the stationary component of the rotary device and wherein access readily can be had to the interior of the race members for the removal or changing of the ball bearings.

Other additional objects of the invention are to provide a ball bearing assembly on which the rotor weight is carried by means of peripherally spaced carrying means extending radially from the rotor, means further being provided to distribute the rotor weight to as many balls as possible around each place of contact between each rotor carried and the race upon which the latter rests and to increase the number of the places of contact of the forces from the rotor weight along the circumference of the ball bearing assembly. Still other objects are to provide a self centering of the rotor upon the ball bearing assembly and to provide means for fixing the rotor and rotatable bearing race peripherally in relation to each other and to provide for relative radial movements between the rotor component and the respective races of the ball bearing assembly, coaxial relationship between the race and the rotor and full registering between both the races still being maintained. Another object is to provide an attachment for a revolving rotor equipment which is inexpensive to manufacture, easy to install and remove or replace and efficient in operation.

The invention is particularly adapted for heat exchange apparatus of the rotary type in which heat exchange between two gaseous fluids is carried out for purposes such as the preheating of air to be used for combustion, by waste heat extracted from combustion gases exhausted from apparatus such as power boilers. The invention will therefore be described hereinafter, by way of example but without limitation, as applied to air preheating structure, but it will be understood that the principles of the invention are susceptible of use in many other applications and that for certain of such applications, the principles of the invention in its broader aspects may be carried out with only certain features of the structure hereinafter described in connection with the air preheater apparatus chosen by way of example.

For a better understanding of the more detailed nature of the invention, the manner in which it may be carried out and the advantages to be derived from its practical use, reference may best be had to the ensuing portion of this specification, taken in conjunction with the accompanying drawings illustrative by way of example but without limitation, of different examples of construction embodying the principles of the invention.

In the drawings:

Fig. 3 is a partial vertical central section, similar to Fig. 1, of another form of a regenerative heat exchanger in which the basket assembly is carried by a structural plate framework.

Fig. 4 is a fragmentary horizontal section taken on line 4—4 of Fig. 3.

Fig. 5 is a fragmentary horizontal section taken on line 5—5 of Fig. 3.

Fig. 6 is a partial sectional view, similar to Fig. 3, of another form of a regenerative heat exchanger in which the basket assembly is suspended from a structural plate framework.

Fig. 7 is a fragmentary section on enlarged scale of a suspension of the baskets from a structural plate framework such as shown in Fig. 6.

Fig. 8 is a fragmentary vertical section on enlarged scale of a form of structure for supporting the rotor on the bearing means.

Fig. 9 is a fragmentary horizontal section, similar to Fig. 6, of a modified arrangement of the means for peripherally supporting and driving the rotor.

Figure 1:
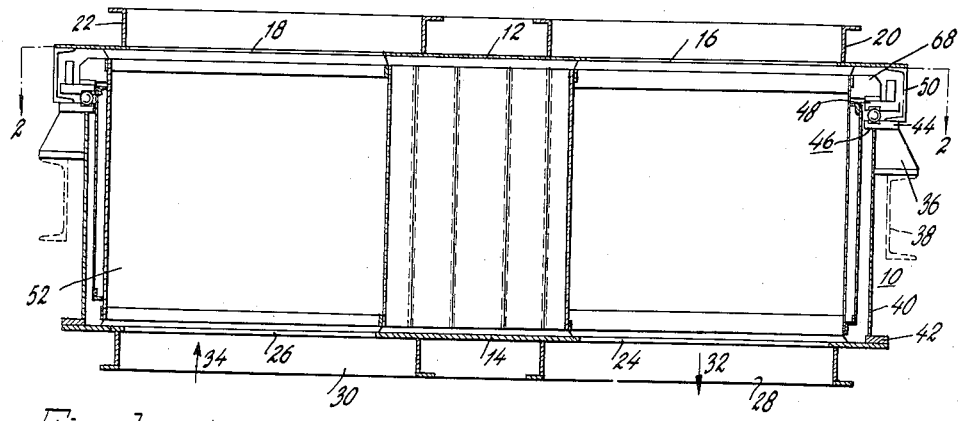
Fig. 1 is a vertical central section taken on line 1—1 of Fig. 2, of a rotary regenerative heat exchanger embodying the principles of the invention.
Figure 2:
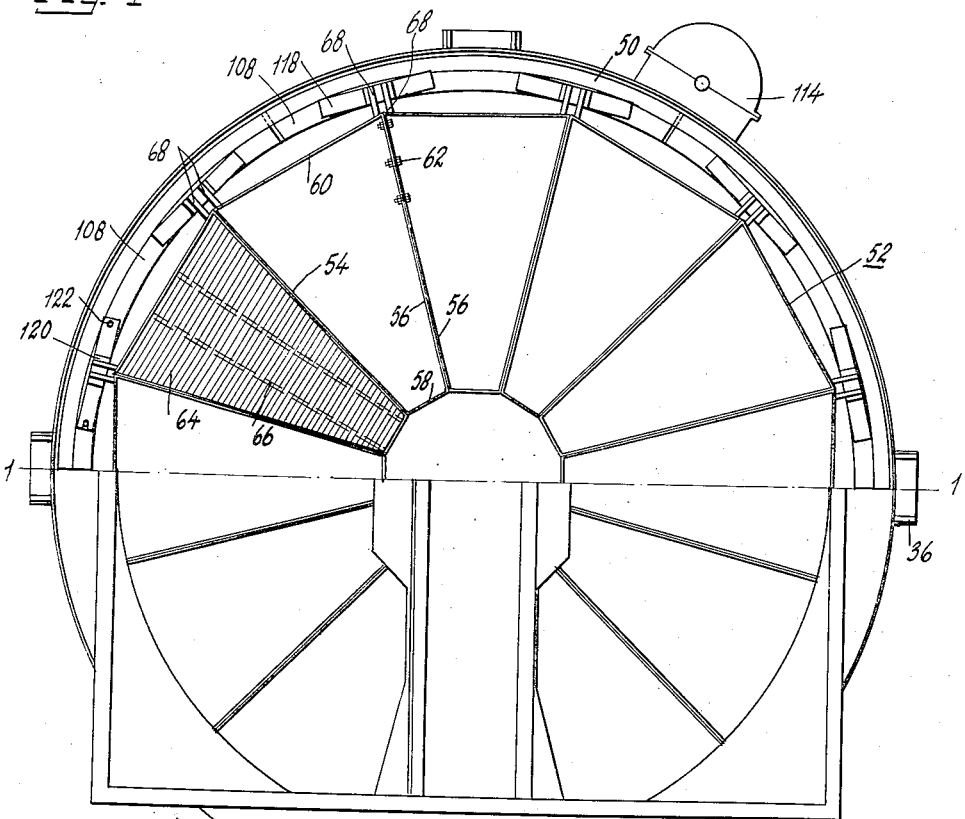
Fig. 2 is a top plan view taken on the line 2—2 of Fig. 1, partly in section, of the heat exchanger shown in Fig. 1.

Referring now more particularly to Figs. 1 and 2 of the drawings, there is illustrated one suitable form of preheater for carrying the invention into effect. The apparatus shown comprises a stationary outer casing structure, indicated generally at 10, having spaced end plates 12 and 14 between which the rotor is mounted. Plate 12 is provided with two sector shaped openings or ports 16 and 18 located generally on opposite sides of a diametral plane through the rotor. These ports are connected respectively with ducts 20 and 22 for conducting one of the heat exchanging fluids to the rotor and the other fluid from the rotor. Plate 14 is likewise provided with sector shaped ports 24 and 26, aligned respectively with ports 16 and 18 in plate 12 and communicating respectively with ducts 28 and 30 for conducting the first mentioned fluid from the rotor and said other fluid to the rotor. Countercurrent flow of the two fluids provides for most efficient heat transfer and in accordance with that practice the apparatus illustrated is advantageously connected so that, for example, cold air to be heated is admitted through duct 20 and port 16 to the top of the rotor and after being heated is discharged therefrom through ports 24 and 28, as indicated by arrow 32, while hot gas to be cooled enters through duct 30 and port 26 to flow upwardly through the rotor and be discharged in the direction of arrow 34 through port 18 and duct 22. With such connections it will be evident that the upper end of the apparatus to which fluid to be heated is admitted and from which cooled fluid is discharged will be referred to as the "cold" end, the opposite end being referred to as the "hot" end. It will be obvious that either the upper end or the lower end may be the cold end, so long as counter current flow relation is maintained depending upon which ducts are connected to the sources of supply of the different fluids.

The rotor is circumferentially enclosed and supported by portions of the stationary structure extending between the end plates, which structure in the present example includes a number of peripherally spaced standards 36 adapted to rest on suitable supporting beams 38 and connecting in rigidly spaced relation a cylindrical shell 40 which advantageously is of relatively thin section because of weight considerations, the weight of the rotor being carried primarily by the standards 36. The shell 40 is connected to a lower ring 42 to which end plate 14 is secured and an upper ring member 44, which constitutes the lower bearing member of a bearing indicated generally at 46 and having an upper bearing member indicated generally at 48 carrying the rotor. The nature of bearing 46 will later be described more in detail.

Member 44 supports a ring 50 of channel section which in turn supports the upper end plate 12. For reasons hereinafter appearing, ring 50 is advantageously formed by a plurality of segmental elements secured to the structure by bolts, studs or the like separately removable.

From the foregoing it will be apparent that the shell 40, member 44 and ring 50 provide a circumferential casing structure encircling the rotor, and that this structure together with the end plates provides a stationary structure encasing the rotor and providing means for supporting it. This stationary structure provides one of the two principal components of the apparatus.

The other principal component is the rotor, indicated generally at 52, which according to a basic feature of the present invention comprises a plurality of sector shaped baskets 54 positioned in abutting relationship around the centre of the rotary device so that the radial sides 56 of contiguous baskets define partitions extending radially from the inner to the outer periphery of the rotor component and the inner and the outer walls 58 and 60, respectively, of the rotor comprise abutting transverse ends of abutting baskets. The baskets are connected to form an integral annular rotor member by fastenings such as bolts or rivets 62 joining the radial side walls 56 along the marginal portions thereof. It is a characteristic of the invention that the baskets of the rotor solely by such fastening together form a coherent central rotor component and that the usual rotor post may be completely dispensed with.

Each of the baskets are filled with regenerative heat exchanging material such as plates 64 mainly vertically disposed and mutually spaced in accordance with well known practice which plates rest upon suitable supports such as radial bars 66 anchored at the bottom of the baskets for supporting the heat transferring material.

In the construction illustrated in Figs. 1 and 2, the rotor component is suspended from the bearing device 46 and for this purpose each of the baskets 54 is provided with radially extending bracket means or fins 68 adjacent each radial side 56 of the basket. By means of such fins 68 resting directly upon the upper rotatable bearing member 48 the rotor 52 may be carried by means of said rotatable bearing member and as the weight of the rotor 52 may be considerable in many instances no further means are necessary to attach the rotor to the rotatable bearing member 48 but the rotor simply rotating with the rotatable bearing member at the turning of the latter due to frictional engagement between the carrying fins 68 and the rotatable bearing member 48.

The regenerative preheater shown in Figs. 3 to 5 has a stationary casing structure in which the bearing device 46 is located at the lower end thereof in order to carry the rotor component by the upper rotatable bearing member 48. The shell 40 of the casing is connected at its top end to an upper ring member 70 to which end plate 12 is secured and at its bottom end to a lower ring member 72 which in turn is secured to the ring 50 of channel section. The ring 50 is formed by a plurality of separately removable segmental sections fastened to the end plate 14. The lower stationary member 74 of the bearing device 46 is also secured to the end plate 14.

The rotor component indicated generally at 76 comprises two superimposed portions 78 and 80, the lower portion 78 of which comprises a structural plate framework made up of T-shaped beams united for instance by welding into the form of a polygonal spoke wheel 78 in which the ends of the spokes 82 extend beyond the outer periphery of the rotor as bracket means 84 to carry the rotor upon the rotatable member 48 of the bearing 46. The upper portion 80 of the rotor comprises an assembly of similar wedge shaped baskets 54 as just described above and united by bolts or rivets along the marginal portions of their contiguous radial side walls 56 and at least the basket structure of both of the rotor portions are filled with heat transferring material. The hub and rim portions 86 and 88, respectively, of the spoke wheel register with inner and outer walls 58 and 60 of the basket structure of the rotor and the spokes 82 of the wheel 78 register with the radially extending partitions of the basket structure formed by the contiguous radial side walls 56 of the baskets, and the basket structure 80 is carried by the spoke wheel 78 on which it may rest simply by its own weight. The open sectors between the spokes 82 may be bridged by chord like bars 90 on which the heat regenerative plates 64 are sustained.

In the air preheater shown in Fig. 6 the position of the spoke wheel 78 and the basket structure 80 is reversed in relation to that of the air preheater just described, the basket structure being suspended from the spoke wheel which latter in its turn is carried on the upper rotatable bearing member 48 of the bearing 46. The construction of the casing is substantially the same as described in connection with the apparatus shown in Figs. 1 and 2. In order to avoid repetition, any further detailed description thereof is omitted, the corresponding parts being designated by like reference characters.

Fig. 7 shows one of the simple ways in which the basket structure may be suspended from the spoke wheel. To the lower edge of beam 92 forming a spoke 82 of the wheel 78 is secured—for instance by welding—a horizontal bar 94 to which the upper margins of contiguous radial side walls 56 of the baskets are fastened by means of angles 96 and bolts 98.

In accordance with a basic feature of the present invention the rotor is rotatably supported at its periphery by the bearing device 46, rather than at or adjacent to its centre or axis of rotation, the many advantages of peripheral support hereinafter to be pointed out being secured by the provision of bearing construction the nature and function of which enables the practical and economical application of peripheral support to be obtained inexpensively and not only with a long life factor but also with relative ease of repair and replacement when wear does occur.

For further description of the bearing construction reference may be had to Fig. 8 which shows the bearing on enlarged scale. The rotor is of the same nature as that of the construction shown in Figs. 1 and 2 but carried at its lower end by means of radial extensions 100 of the radial side walls 56 themselves of the baskets, said extensions forming fins or lugs which carry the rotor supported on the bearing.

The lower bearing member 74 is provided with a load-carrying raceway 102 in the form of an annular recess and preferably so that the lower bearing member is made up of a number of segments each providing a segmental section of the annular recess 102 in the corners of which are located arcuate lengths of wire 104 providing lower rails upon which a multiplicity of balls 106 may roll.

The number of lengths or sections of wire in each circumference may vary and if desired each rail may consist of only one piece. The joints between adjacent ends of wire should however be staggered.

The upper bearing member 48 may comprise a rigid ring but in a preferred construction the same is comprised of a plurality of arcuate elements 108 each providing a segmental section of an annular recess 110 forming the upper raceway for the balls 106 registering with the lower raceway 102. The arcuate elements 108 carry pins 112 which form the teeth of a peripheral rack with which the driving gear 114 for turning the rotor meshes. Additional arcuate lengths of wire in the corners of recess 110 provide upper rails engaged in rolling contact by balls 106, the latter being held in evenly spaced relation peripherally by the retainer 116 which is also advantageously in the form of a series of separate segmental elements.

As in the case of the lower rails, the joints in the upper rails should be staggered both with respect to each other and also with respect to the joints in the lower rails, so that no ball passes over more than one joint at a time.

The rotor during the operation becomes hot and expands radially relative to the housing. The brackets or fins 68, 84 or 100 which carry the rotor are free to slide radially upon the upper rotatable bearing member 48 but particularly in rotor constructions of very large diameter due to heat conducted to the upper bearing member the same will increase considerably in width so that the exact registering between the races in the upper and lower bearing members would be affected. In order to avoid the differential expansion between the upper and lower bearing members due to temperature difference it is advisable to make at least one of the bearing members, for instance the rotatable bearing member, of relatively movable segments 108 permitting radial enlargement and contraction of the rotatable bearing member while still retaining the coaxial alignment of the bearing tracks.

The plurality of ring segments 108 are independently movable in radial direction relative to the rotor brackets or fins 68, 84 or 100 and individually guided thereto in a manner which will be described below. Generally at least one carrying bracket 68, 84 or 100 is brought to register with each ring segment 108, the latter being fixed peripherally in relation to the rotor, such mutually fixed peripheral relationship being effected by means of the carrying brackets or fins 68, 84 or 100.

However, as it is not possible in practice to manufacture the preheater with sufficient precision for all the carrying brackets or lugs to make contact with the rotatable bearing member 48, in the constructions shown resilient means in the form of arcuately upwardly bent plate springs 118 are provided between each bracket or fin 68, 84 or 100 and the rotatable bearing ring 48. Such a plate spring is designed for instance so that the same permits a springing from 1 to 2 mm. Besides the advantage of a more even force distribution on the bearing ring 48 these resilient means 118 resting at both their ends on the rotatable bearing ring 48 produce twice as many contacts or force transmitting points upon the rotatable bearing ring 48. The rotatable bearing ring, which may be made for instance in six or more segmental sections, depending upon the size of the preheater, can for reasons of costs be made only of limited thickness and thus the weight of the rotor is distributed upon a relatively small number of balls 106 along the extension of the rotatable bearing ring reckoned from each place of load transmitting contact. An increase in the number of load transmitting contact points results in that a greater number of balls are carrying the weight of the rotor.

The general arrangement of the brackets or fins 68, 84 or 100 and the segmental sections 108 is preferably such that a symmetrical distribution of the parts is obtained and the load also is distributed evenly. The resilient means can be utilized to bridge the joints between the segmental sections 108 of the upper bearing ring 48 as for instance the plate spring 118 in Fig. 4. With the plate springs only located in this way as bridging means between the ends of the segmental sections 108 the weight of the rotor is transferred to each segmental section via the brackets or fins 68, 84 and 100 in two places, viz., at the ends thereof.

The arched plate springs 118 engage the rotor brackets or fins 68, 84 or 100 at the apex thereof and are provided with guide means in the form of projections 120 thereon for registering with the rotor carrying brackets or fins 68, 84 or 100. Said guide means 120 serve on the one hand as drivers for the rotatable bearing member and on the other hand as means to center the rotor upon radial expansion thereof due to heating. The plate springs may be fixed in peripheral direction relative to the bearing ring segmental sections 108 by means of stop pins or bolts or screws 122 fastened to the segmental sections. Owing to its design the plate spring is easily removable and for such purpose a segmental element of the ring 50 is removed for dismantling of a bearing section. When the segmental ring element is removed the plate spring 118 can be drawn out by means of a suitable tool and a segmental section 108 of the upper bearing ring 48 may then be removed without lifting of the rotor. After mounting of the segmental section of the upper bearing ring the plate spring is forced into position and the segmental ring element is reinserted.

The structure just described provides numerous important advantages with respect to both initial cost and upkeep. As to the former, the use of the wire elements 104 to provide the tracks for the balls eliminates the need for providing finely finished surfaces forming the recesses 102 and 110. The wire elements themselves are very inexpensive, advantageously being made of piano wire or other high carbon or steel like metal of similar elastic nature. Balls 106 are advantageously of the kind used in standard ball bearings and also may be relatively inexpensive since the action of the bearing is such that a high degree of precision in the parts is not required and balls rejected for use in ordinary ball bearings because of failure to meet dimensional tolerances may readily be used. The reason for this is that the number of balls employed in relation to the weight carried is such that the balls deform the wire rails sufficiently to create narrow tracks on the rails, and the elasticity of the metal of the rails and of the balls themselves is sufficient to compensate for minor dimensional variations. The elastic deformation that is possible with the construction described also insures even distribution of the weight carried by the bearing. Such construction is made practically possible because of the fact that in apparatus of the kind under consideration the speed of rotation of the rotors is only a very few revolutions per minute, so that even in the case of relatively very large diameter rotors the linear speed of operation of the bearing is very low as compared with usual anti-friction bearing applications. Wear is thus very slow particularly since temperature conditions may be controlled so that the bearing may readily be grease lubricated. Because of the anti-friction nature of the bearing, power consumption is very low.

By virtue of the manner in which the tracks or rails are formed on the rails by the action of the bearing itself, sections or segments of the rails and also individual balls that become unduly worn or otherwise defective can readily be replaced and this is easily accomplished because of the removable segmental construction of the parts 50 and 108 giving access from the exterior of the casing to the balls and rails. In the construction shown, balls and rail segments can be removed while the bearing is under load.

It will be evident that the bearing construction is such that not only is the lower bearing member 46 (Fig. 1) fixed both radially and axially with respect to the end plate 12, but also the upper bearing member 48 which is radially fixed by the balls 106. The pins 112 are thus fixed with respect to the stationary structure carrying the driving gear 114 which enables simple and inexpensive forms of gearing to be used and also makes the apparatus adaptable for friction drive.

The fixed position of the bearing member 48 axially relative to the end plate 12 (Fig. 1) is highly important from the standpoint of effective sealing, since it maintains the end of the outer rotor shell located in substantially fixed relation axially with respect to the adjacent end plate regardless of dishing or other distortion of the rotor caused by temperature differentials. As the sealing means form no part of this invention reference may be had to our copending patent application Ser. No. 349,344, now U.S. Patent No. 2,936,160 granted May 10, 1960, for the arrangement of appropriate seals and the details of construction thereof. Peripheral and radial seals are shown schematically in the drawings and are denoted 124 and 126, respectively, in Fig. 8. The latter seals may be attached between the radial sides of contiguous baskets.

The casing encircling the rotor may be provided with a door 128 for access to the rotor from the exterior and of sufficient width to permit removal and replacement of a basket of the basket assembly constituting the rotor. In Fig. 5 the door 128 is a removable section of the shell 40 and the joints between the door section of the shell and the rest of the shell are closed by strips 130.

In the preheater according to Fig. 9 the baskets 54 are provided with flange like projections 132 projecting horizontally outwardly and each forming a segmental section of a continuous annular flange surrounding the outer wall of the rotor, said outer wall comprising abutting arc shaped ends 134 of abutting baskets. By means of this annular flange the rotor is carrier on a bearing of the character described above. Fig. 9 also shows alternatively that the flange of the rotor instead of the upper rotatable member of the bearing is provided with the rack of the peripheral drive pins 112.

In the construction shown in Figs. 3 and 6 with the rotor made in two portions which may be filled with regenerative elements of different material, for instance one of the portions consisting of a more heat resisting material than the other.

From the foregoing it will be obvious that the principles of the invention may be carried into effect by means of a wide variety of specific structural embodiments, that various features may be combined in different ways and that certain features may be employed to the exclusion of others. The invention is accordingly to be understood as embracing all forms of apparatus falling within the scope of the appended claims.

What we claim is:

1. A rotary heat exchanger comprising a rotor component, a stationary component including apertured end plates the apertures of which define paths of flow of different heat-exchanging media and bearing means for rotatably supporting the rotor component at the outer periphery thereof with respect to the stationary component, said rotor component constituting a coherent unit comprising a plurality of sector-shaped baskets positioned in abutting relationship around the axis of the device so that the radial sides of contiguous baskets define partitions extending radially from the inner to the outer periphery of the rotor component, the inner and the outer walls of the rotor component being comprised of abutting transverse ends of abutting baskets, the radial sides of contiguous baskets being fastened together whereby the assembly of said baskets alone forms a completely coherent rotor the inner and outer circumferential walls of which are formed by the transverse ends of the baskets, each of said baskets being provided with means for supporting the same on said bearing means.

2. A rotary heat exchanger as claimed in claim 1, in which the rotor component is suspended on the bearing means.

3. A rotary heat exchanger as claimed in claim 2, in which the rotor component is suspended at the top end thereof.

4. A rotary heat exchanger as claimed in claim 1, in which the rotor component is carried by the bearing means.

5. A rotary heat exchanger as claimed in claim 4, in which the rotor component is carried at the lower end thereof.

6. A rotary heat exchanger comprising a rotor component, a stationary component including apertured end plates the apertures of which define paths of flow of different heat-exchanging media and bearing means for rotatably supporting the rotor component at the outer periphery thereof with respect to the stationary component, said rotor component comprising a plurality of sector shaped baskets positioned in abutting relationship around the centre of the rotary device so that the radial sides of contiguous baskets define partitions extending radially from the inner to the outer periphery of the rotor component and the inner and outer walls of the rotor component comprise abutting transverse ends of abutting baskets, whereby said rotor component is formed solely by said baskets, and said bearing means comprising two bearing members coaxial with the rotor component, a first one of said bearing members being associated with said rotor component and mounted to rotate therewith, the outer transverse end wall of each of said baskets being provided with a radially extending substantially horizontal flange supported on said first one of said bearing members, a second one of said bearing members being associated with said stationary component and rotationally stationary therewith, and one of said bearing members and the component with which it is associated being relatively movable laterally with respect to each other.

7. A rotary device as claimed in claim 6, in which the flanges of the baskets are provided with driving means for peripheral drive of the rotor component.

8. A rotary heat exchanger as claimed in claim 6, in which the bearing member associated with the rotor component is provided with driving means for peripheral drive of the rotor component.

9. A rotary heat exchanger as claimed in claim 6, in which the bearing means comprises a lower stationary supporting member having an annular recess on the upper side thereof coaxial with the rotor component, an upper rotatable member supporting the rotor and having an annular recess on the under side thereof adapted to register with the annular recess in the stationary supporting member, arcuate lengths of wire located in the corners of said annular recesses, and anti-friction bearing elements engaged in rolling contact with the lower and upper rails provided by said arcuate lengths of wire located in said annular recesses.

10. A rotary heat exchanger as claimed in claim 9, in which at least one of the bearing members is made up of a plurality of relatively movable segmental sections permitting radial enlargement and contraction of the bearing member.

11. A rotary heat exchanger comprising within a stationary casing including apertured end plates the apertures of which define paths of flow of different heat-exchanging media a rotor component made up of a plurality of sector shaped baskets provided with at least one radially extending bracket means each and positioned in abutting relationship around the centre of the rotary device so that the radial sides of contiguous baskets define partitions extending radially from the inner to the outer periphery of the rotor and the inner and the outer walls of the rotor comprise abutting transverse ends of abutting baskets; whereby said rotor component is formed solely by said baskets, a ball bearing construction including a lower stationary supporting member having a raceway on the upper side thereof coaxial with the rotor component, an upper rotatable member having a raceway on the under side thereof adapted to register with the raceway in the stationary member, anti-friction bearing elements in said raceways for maintaining the members in axially spaced relation, the bracket means being supported at circumferentially spaced places by the rotatable bearing member in order to sustain the weight of the rotor component by the plurality of bracket means supported on the rotatable bearing member.

12. A rotary heat exchanger as claimed in claim 11, in which the bracket means comprise radially extending vertical fins.

13. A rotary heat exchanger as claimed in claim 12, in which the outer wall of each basket is provided with a radially extending vertical fin adjacent each radial side of the basket.

14. A rotary heat exchanger as claimed in claim 13, in which the bracket means comprise radial extensions of the abutting radial sides of contiguous baskets.

15. A rotary heat exchanger as claimed in claim 13, in which a plurality of circumferentially spaced resilient supporting means rest on the rotatable bearing member and are adapted to register each with a pair of vertical fins extending radially adjacent the abutting radial sides of contiguous baskets in order to sustain the weight of the rotor component by the plurality of said pairs of vertical fins resiliently supported on the rotatable bearing member.

16. A rotary heat exchanger as claimed in claim 12, in which the upper rotatable bearing member comprises a plurality of circumferentially spaced segmental sections, each of which supports at least one of the vertical fins for sustaining the rotor component.

17. A rotary heat exchanger as claimed in claim 15, in which the resilient supporting means bridge the joints between the segmental sections of the upper rotatable member.

18. A rotary heat exchanger as claimed in claim 17, in which the resilient supporting means comprise arched plate springs and in which means are provided on the segmental sections of the upper rotatable bearing member to fix the position of the arched plate springs thereon and to maintain said segmental sections in their circumferentially spaced relationship.

19. A rotary heat exchanger comprising a rotor component, a stationary component including apertured end plates the apertures of which define paths of flow of different heat-exchanging media and bearing means for rotatably supporting the rotor component at the outer periphery thereof with respect to the stationary component, said rotor component comprising two superimposed portions, a first portion of which comprises a structural plate framework supported by said bearing means and the second portion of which comprises a basket structure supported by said first portion and comprising a plurality of sector shaped baskets positioned in abutting relationship around the centre of the rotary device so that the radial sides of contiguous baskets define partitions extending radially from the inner to the outer periphery of the rotor component and the inner and the outer walls of the rotor component comprise abutting transverse ends of abutting baskets.

20. A rotary heat exchanger as claimed in claim 19, in which the structural plate framework comprises a spoke wheel, the hub and rim portions of which register with the inner and outer walls, respectively, of the basket structure of the rotor component and the spokes of which register with the radially extending partitions of the basket structure.

21. A rotary heat exchanger as claimed in claim 20, in which the spokes extend beyond the outer periphery of the rotor component as bracket means to carry the rotor component on the peripherally disposed bearing means.

22. A rotary heat exchanger as claimed in claim 20, in which the spoke wheel forms the lower portion of the rotor component and the baskets are carried upon the spoke wheel.

23. A rotary heat exchanger as claimed in claim 20, in which the spoke wheel forms the upper portion of the rotor component and the baskets are suspended in the spokes of the spoke wheel.

24. A rotary heat exchanger as claimed in claim 19, in which at least the basket structure portion of the rotor component is filled with regenerative elements.

25. A rotary heat exchanger as claimed in claim 24, in which also the structural plate framework portion is filled with regenerative elements.

26. A rotary heat exchanger as claimed in claim 25, in which the regenerative elements in the two portions of the rotor are made up of different materials.

27. A rotary heat exchanger as claimed in claim 6, in which the stationary component comprises a casing encircling the rotor and being provided with door means for access to the rotor component from the exterior.

References Cited in the file of this patent

UNITED STATES PATENTS

| | | |
|---|---|---|
| 2,432,198 | Karlsson et al. | Dec. 9, 1947 |
| 2,549,583 | Eckersley | Apr. 17, 1951 |

FOREIGN PATENTS

| | | |
|---|---|---|
| 758,672 | Germany | Nov. 2, 1944 |
| 1,082,683 | France | Dec. 31, 1954 |